(12) United States Patent
Kim et al.

(10) Patent No.: US 7,401,859 B2
(45) Date of Patent: Jul. 22, 2008

(54) DEFORMABLE RESTRAINT GUIDE FOR USE WITH CHILD RESTRAINT SYSTEM

(76) Inventors: Hoon Y. Kim, 3343 W. Eastwood, Chicago, IL (US) 60625; Hyun S. Kim, 3343 W. Eastwood, Chicago, IL (US) 60625

( * ) Notice: Subject to any disclaimer, the term of this patent is extended or adjusted under 35 U.S.C. 154(b) by 473 days.

(21) Appl. No.: 10/952,081

(22) Filed: Sep. 28, 2004

(65) Prior Publication Data
US 2006/0071535 A1    Apr. 6, 2006

(51) Int. Cl.
*B60R 22/14* (2006.01)
(52) U.S. Cl. .................... 297/465; 297/472
(58) Field of Classification Search ............ 297/465, 297/468, 472; 24/176, 198, 200
See application file for complete search history.

(56) References Cited

U.S. PATENT DOCUMENTS

| | | | | |
|---|---|---|---|---|
| 2,260,060 A | * | 10/1941 | Shaulson | 24/200 |
| 3,361,475 A | * | 1/1968 | Villiers | 297/472 |
| 4,226,474 A | * | 10/1980 | Rupert et al. | 297/484 |
| 4,236,755 A | * | 12/1980 | Pollitt et al. | 297/483 |
| 4,787,677 A | * | 11/1988 | Reighter | 297/464 |
| 5,733,004 A | * | 3/1998 | Celestina-Krevh et al. | 297/250.1 |
| 6,314,578 B1 | * | 11/2001 | Masuda et al. | 297/465 |
| 6,902,193 B2 | * | 6/2005 | Kim et al. | 280/801.1 |

* cited by examiner

*Primary Examiner*—Peter R. Brown
(74) *Attorney, Agent, or Firm*—Welsh & Katz Ltd.; Daniel M. Gurfinkel

(57) ABSTRACT

Deformable guides for use with smaller persons and/or in a child restraint system are provided. The guides are of at least two varieties, one for inclusion within a belt system, so as to absorb the impact and stresses of a collision or other abrupt vehicular motion and the other of a type useful to guide the restraint system of an automobile about the correct location on a smaller person. The second type permits a smaller individual to be properly secured to a restraint system in spite of his small stature. The guides are made of multiple layers of metal, plastic or other structurally significant materials, or combinations thereof, and designed to receive the energy of a collision such that a guide will deform, without breaking, absorbing the energy of a collision or other abrupt action.

14 Claims, 7 Drawing Sheets

DEFORMABLE RESTRAINT GUIDE FOR USE WITH CHILD RESTRAINT SYSTEM

FIELD OF THE INVENTION

The present invention concerns child safety restraint systems for use in automobiles. More specifically, the invention concerns deformable connection guides for use in a child restraint system, such that when an accident occurs the energy of the accident deforms the guide rather than harm the user.

BACKGROUND OF THE INVENTION

Automobile restraints typically comprise some form or forms of belts, having, typically, two parts that connect to each other to permit ingress and egress into the system while providing means to hold a passenger or vehicle operator within the seat. As is well known, such belts typically comprise, respectively, a portion with a buckle and a portion with an insert for attachment within the buckle. Both seat and shoulder belts comprise similar elements and modern restraint systems combine both a seat and shoulder belt, such that a three point restraint system is established.

Such restraint systems, while forming an operable and sufficient system for use by an adult are typically ineffective for use by a child, or anyone under a certain height and weight. In order to compensate for height and weight considerations many systems have been developed to make an adult seat and shoulder belt fit a smaller individual. Typically such modifications to adult-sized restraint systems are ineffective and cause dangerous conditions, such as the child slipping beneath the shoulder belt and out of the restraints, to occur.

Other systems, such as booster chairs and child restraint seats have been developed which more readily and safely utilize the built in restraint systems to provide a safer environment for a child. Unfortunately, such systems are large, heavy and bulky and are difficult to transport from automobile to automobile, causing parents to neglect the use of such systems, particularly when going from vehicle to vehicle or when on vacation and utilizing rental cars or taxis.

We have developed a child restraint system wherein a vest for a child safety is provided. The vest, which is the subject of copending U.S. patent application Ser. No. 10/177,312, filed Jun. 21, 2002, and presently pending, and is a continuation in part of U.S. Provisional Application No. 60/354,700, filed Feb. 5, 2002, and is a continuation-in-part of U.S. patent application Ser. No. 10/083,083, filed Feb. 26, 2002, and presently pending, which is a continuation-in-part of U.S. patent application Ser. No. 09/968,066, filed Oct. 1, 2001, and presently pending, and claims the benefit of the filing date of U.S. Provisional Patent Application No. 60/236,854, filed Sep. 29, 2000, all of which are incorporated herein in their entireties as if set forth herein, includes means to safely and securely attach a child to an automobile restraint system. These devices, however, tend to utilize standard hook systems to attach the seat and shoulder belts to the vest. While such a system is entirely effective and easy to transport and use, between cars and on vacation, the points of contact between vest and the vehicle restraint system can causes stresses on the wearer of the vest during increases inertial reactions, such as a sudden deceleration or stop (as in an accident).

It would be desirable to have a means of connection between such a vest and a vehicle restraint system that would minimize the stresses formed in such situations. Such a vest would utilize advanced technology to transfer the stress and energy of an accident to an element of the supplemental restraint system rather than to the passenger.

SUMMARY OF THE INVENTION

In accordance with the present invention a guide is provided comprised of at least two layers of deformable material. The guide is constructed using high strength materials, such that they can hold a garment, or other device, to an automobile restraint. The guide has characteristics consistent with other high strength materials used to protect passengers from strains and stresses of automobile accidents or other forces found in moving vehicle conditions. The guide is provided in at least two embodiments, first as a means to attach a seat belt to supplemental restraint system worn by a passenger, and second as an element of a belt system, such as between the belt and the buckle, to provide a "shock absorbing" effect to the belt system.

In a preferred embodiment, the supplemental restraint system comprises a vest to be worn by a person within a vehicle and at least one guide for attaching the seat and shoulder belts of the vehicle to the vest. In this preferred embodiment, the guide is made of layers of metal that are deformable under accident-caused stress, such that the energy of the accident is expended in deforming the guide. In one embodiment, more than one guide is provided, such that the vest, or other device can be worn by a passenger on the right or the left side of the automobile. Each set of the shoulder and seat belts of a vehicle can be attached to the vest by at least one guide. In another embodiment, the supplemental restraint system comprises a vest, of the type described above, having four guides such that the shoulder belt of the vehicle is attached to the vest by one guide, on either the right or left side of the vest, and the seat belt of the vehicle is attached to the vest by two guides. In such an embodiment, the passenger is held to the vehicle in substantially a three point harness system. In the present embodiment the shoulder belt of the vehicle is attached to the vest by one guide, the guide being attached to the vest at or near the shoulder, and the seat belt of the vehicle is attached to the vest by two guides, a fourth guide being attached at or near the other shoulder of the vest such that the vest can be warn for use with either the right or left shoulder belt of the vehicle.

In another embodiment, the guide is placed within a belt, such as a seat or shoulder belt, or a harness tether, such that the belt is divided into two sections, each attached to a portion of the guide or between the belt portion and the buckle. When a stress is applied, such as in a rapid deceleration or a crash, and the weight of a passenger is thrown against the belt structure, the guide deforms such that the guide absorbs the energy of the crash, rather than transmitting the energy of the crash to the passenger.

In a preferred embodiment, the guide is composed of steel, or other structurally significant metal. In another embodiment, the guide is composed of plastic. In another embodiment the guide is composed of a metallic alloy. It will be understood by persons having skill in the art, that the guide of the present invention is limited, in materials, only by the capability of the material to provide a desirable response to vehicle movements and accidents.

The materials used in the preparation of the guide of the present invention will be of the type wherein the guide is formed by layers of the material attached together such that when stressed the layers remain attached but become deformed apart from each other.

DETAILED DESCRIPTION OF THE ILLUSTRATIVE EMBODIMENTS

Figure 1:
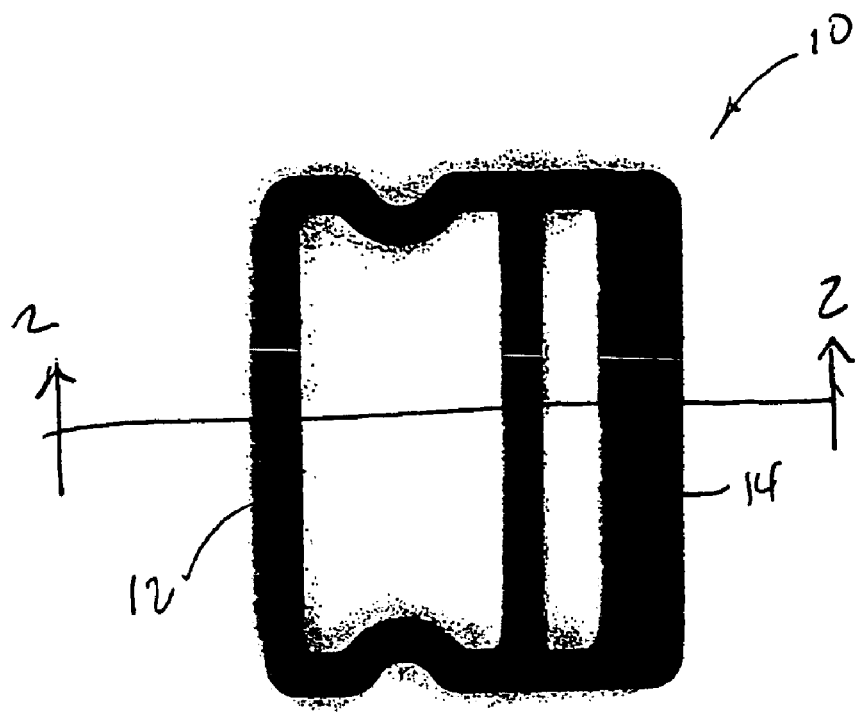
FIG. 1 is an elevational view of the guide of the present invention.

While the present invention is susceptible of embodiment in various forms, there is shown in the drawings a number of presently preferred embodiments that are discussed in greater detail hereafter. It should be understood that the present disclosure is to be considered as an exemplification of the present invention, and is not intended to limit the invention to the specific embodiments illustrated. It should be further understood that the title of this section of this application ("Detailed Description of the Illustrative Embodiment") relates to a requirement of the United States Patent Office, and should not be found to limit the subject matter disclosed herein.

As seen in the figures, a child supplemental restraint system is shown and describe in various drawings and figures. The system includes deformable guides for use in association with seatbelts and shoulder belts and other guides for use within a seat, shoulder or safety belt. Both types of deformable guides are designed in multi-layer formation such that when an accident or other stress situation occurs, the guide is deformed to absorb the energy of the impact, thus alleviating the user from the stresses of an impact or other forces. As shown in many of the diagrams, the guides in a pristine or new condition, are typically squared off and unstretched or unstrained. As shown in the several figures demonstrating the guide after a stress, that is the equivalent of an auto accident or worse, the guide is in a deformed or stretched out shape. It will be understood that these guides deform in the presence of stresses and strains which, but for the guides, would be transferred to the passenger using the restraint systems employing the guides.

It will be seen that the guides are, in a preferred embodiment, made of various, that is one or more, layers and that, after deformation, the layers have elongated depending on the amount of stress each layer has received from the impact. As will be explained below, in a preferred embodiment, the guide layers are made of metal, however, it will be understood that the guide layers can be made of any structurally durable material, and that the various layers can be made either of the same material or of different materials to take best advantage of characteristics of such materials.

Figure 2:
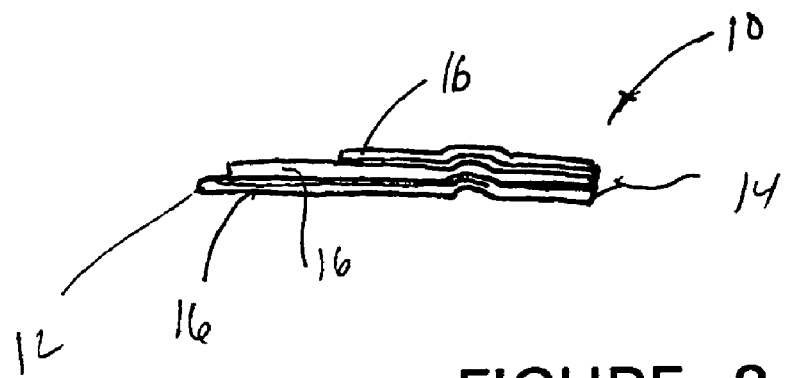
FIG. 2 is a cross sectional view of the guide of FIG. 1.

Referring to the drawings, FIG. 1 shows a first type deformable guide 10 of the present invention. The guide 10 is generally rectangular in shape, having a first connection side 12 and a second connection side 14, each of which will, in actual use, be connected to one or the other of a belt segment, so as to provide an expandable buffer in the event of stresses or strains producible in an automobile. As shown in FIG. 2, guide 10 is comprised of one or more layers 16 of structurally significant materials, including but not limited to metals, plastics, cloths, alloys and others, attached together to permit there partial separation in response to forces, in the direction of the axis of the force.

Figure 3:
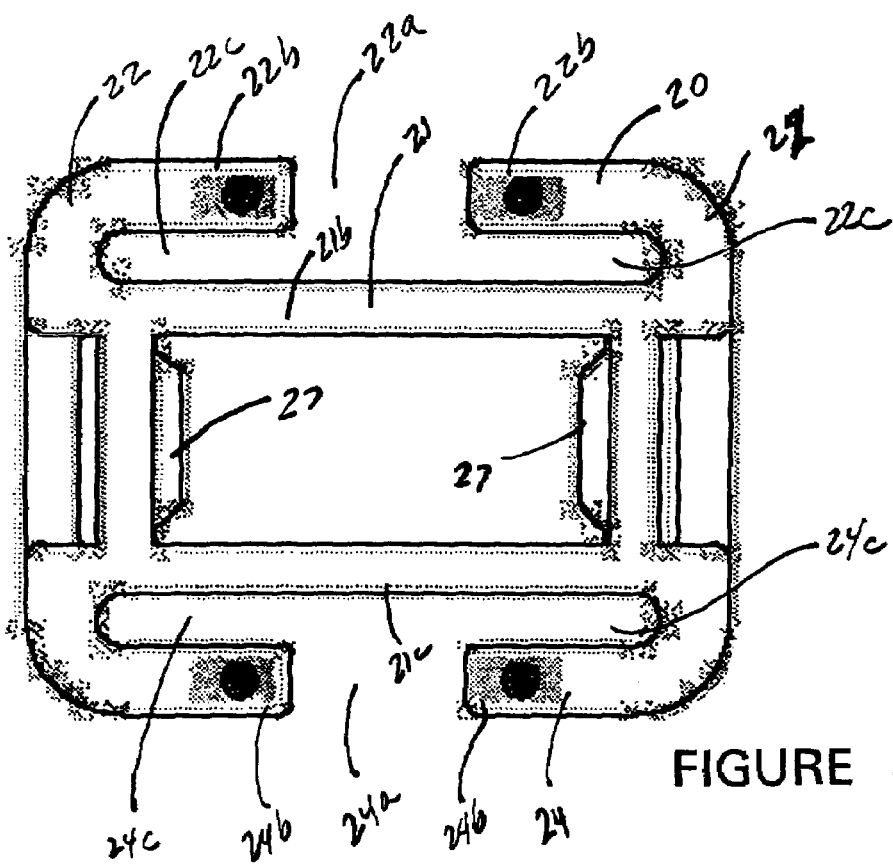
FIG. 3 is an elevational view of an assembled deformable guide of the present invention.

Referring now to FIG. 3, a second type guide 20, for use in association with a vest or other supplemental restraint system, is shown. The guide 20 comprises a base frame 21 which is attachable to a vest or other protective garment and further comprises a first end 22 and second end 24 each comprising an opening, respectively 22a and 24a into which a seat or shoulder belt (not shown) can be interwoven such that the belt is within the opening 22a and opening 24a. The guide 20 thus attached to a vest, or other protective garment, and to the supplemental restraint system of an automobile, thus secures the wearer of the supplemental restraint system to the automobile restraint system, a.k.a. the seat or shoulder belt. It will be seen that the first and second ends 22, 24, each comprise inward facing wings, respectively 22b and 24b, which frame openings 22a and 24a, respectively. An opening 22c and 24c, on each end 22, 24, is formed by inward facing ends 22a, 24a and base frame 21, into which a seat or shoulder belt may be held, as described below.

Figure 4:
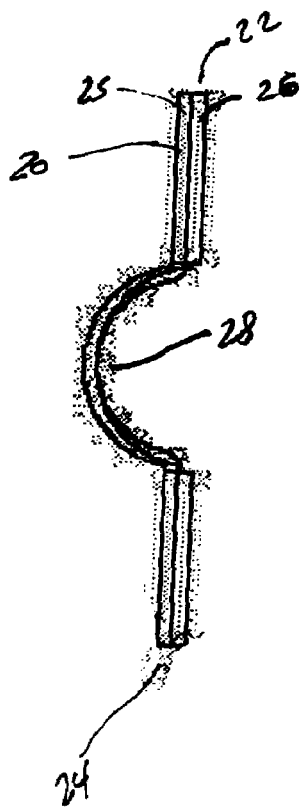
FIG. 4 is a side elevational view of the assembled guide of FIG. 3.

As shown in FIG. 4, guide 20 is comprised of multiple parts 25 attached together, such that the parts are pulled apart, while remaining attached, in the presence of vehicular forces, such as rapid deceleration or crash. Guide 20 is further comprised, in the illustrative example, of two elements a guide top 25 and a guide bottom 26. Guide top 27 and guide top 25 are provided to assist in locking elements of a vest or other garment to guide 20 (see FIG. 10), as will be explained below.

As shown in FIG. 4, guide elements 25 and 26 are sandwiched together to provide a strengthened unified guide 20. Central to guide 20, guide elements 25 and 26 are arched 28 to assist in the feeding and engagement of both elements that attach guide 20 to a supplemental restraint system and which permit the attachment of guide 20, and can concomitantly the supplemental restraint system (rest) to the automobile seat or shoulder belt.

Referring to FIGS. 5, 6, 7 and 8, elements of guide 20 are shown in greater detail, and prior to attachment together.

Figure 5:
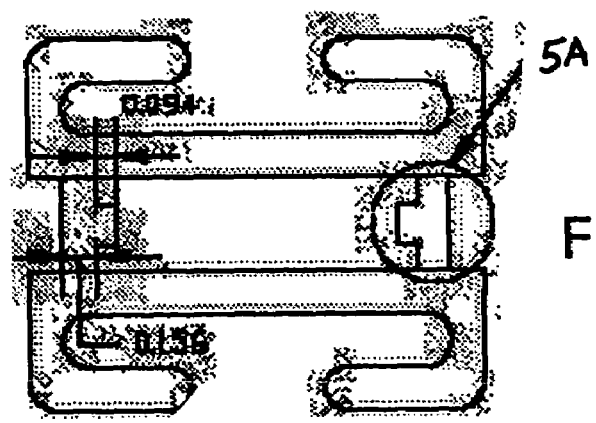
FIG. 5 is an elevational view of the top element of a two-part guide of the present invention.
Figure 5A:
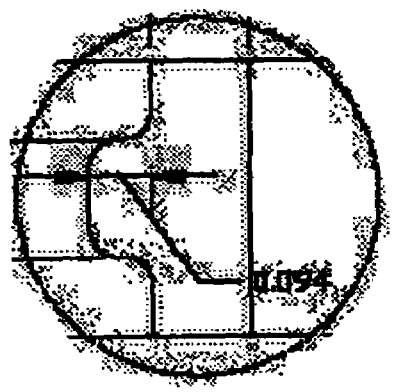
FIG. 5A is an enlarged plan view of the guide element of FIG. 5.
Figure 6:
FIG. 6 is a side elevational view of the guide element of FIG. 5.
Figure 7:
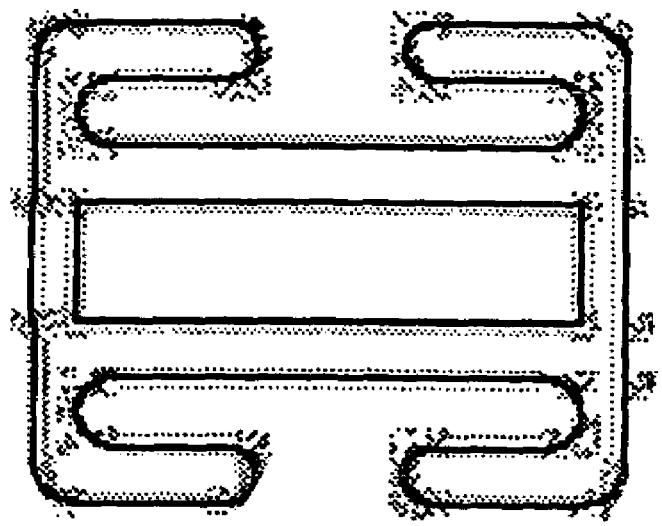
FIG. 7 an elevational view of the bottom element of a two-part guide of the present invention.

FIG. 5 shows the outer or upper guide element 25. FIG. 7 shows the lower or inner guide element 26. It will be seen that tabs 27 are parts of outer guide elements 25. Tabs 27 are inward facing elements which will hold a belt in a friction fit such that guide 20 will hold fast to a location as a supplemental restraint garment until the movement is denied. In the use of guide 20, as will be explained below, and in associating with FIG. 10, a belt, or other restraining means attached to the restraint garment (FIG. 10) is fed under inward facing wing 22b through spring 22c, over base frame top element 21b under tabs 27, over from bottom element 21c through opening 24c under wing 24b, thereby holding guide 20 to a garment. A seat, or shoulder belt, can then be fed into openings 22c and 24c attaching the garment to the automobile restraint system.

Figure 8:
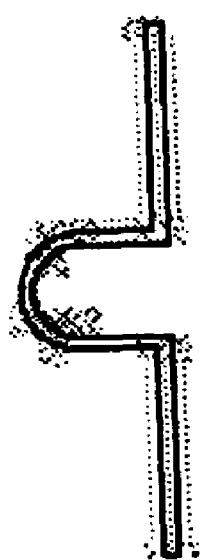
FIG. 8 is a side elevational view of the guide element of FIG. 7.

Referring to FIGS. 7 and 8, the lower or inner guide element 26 is shown in detail. Guide 26, in a preferred embodiment, is constructed in a manner similar to that of upper guide 25, except that typically, it will not have tabs (27). It will be understood that lower guide 26 can be constructed with guides without departing from the novel scope of the present invention.

Figure 9:
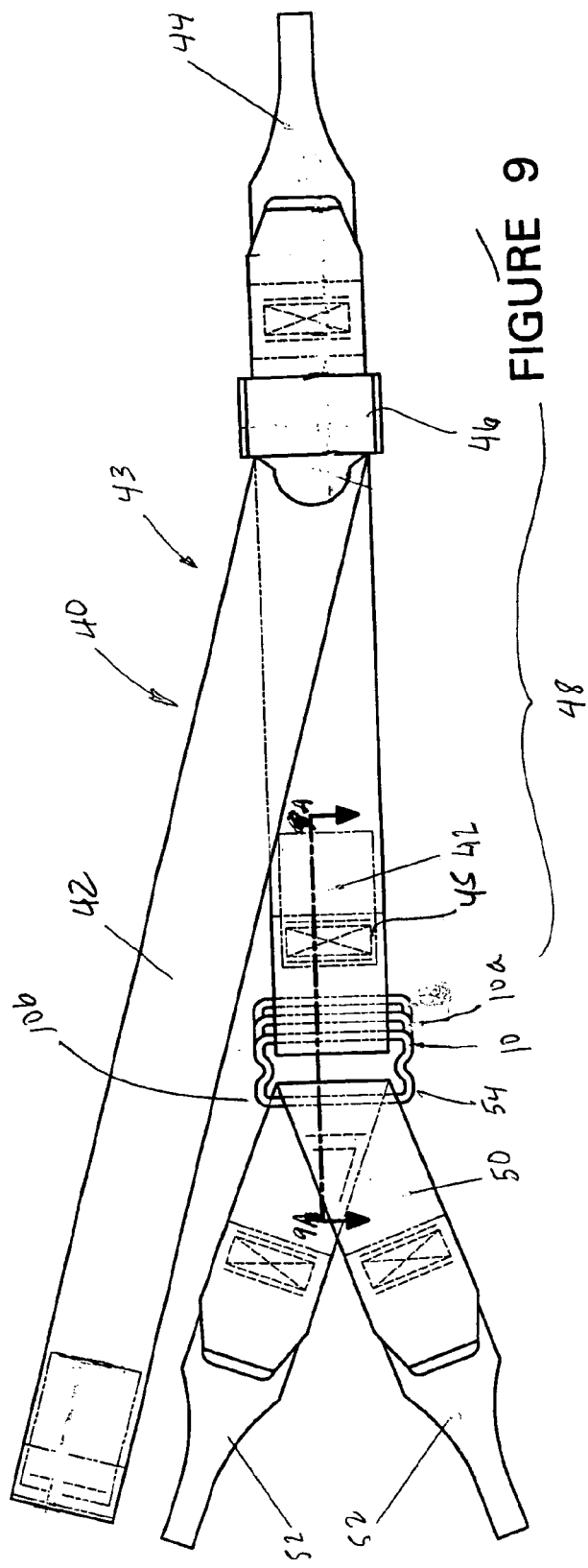
FIG. 9 is an elevational view of a three part deformable guide in use on a harness tether.
Figure 9A:
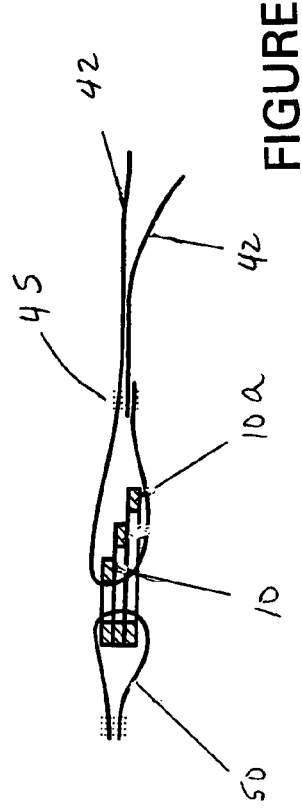
FIG. 9A is a cross-sectional view of the deformable guide of FIG. 9.

Referring to FIG. 9, a harness 40 for use in association with children's car seats is shown as an illustrative example of the use of the first type guide 10. Harness 40 is comprised of a first main belt 42 which has threaded thereon a first harness attachment element 44, such as a tether hook, in a manner well known in the art. Typical in the connection of a tether hook 44 to a belt system 43, is the use of an adjustment device 46, which permits more or less of belt 42 to make up belt length 48, allowing for ease of adjustment as is well known. Guide 10 is attached to belt 42, in a manner well known in the art, including by use of stitches, adhesives, rivets and other fastening and attaching means (45); by feeding a portion of the fabric of belt 42 within one or more of the loops on a first side 10a of guide 10 and folding the fabric over onto itself and applying any one or more of the above noted attachment means. In FIGS. 9 and 9a, it can be seen that a second belt 50, having tether hooks 52 and an adjustment device 54 are provided such that belt 52 is looped onto the second side 10b of guide 10. While a two ended tether belt 50 is shown in association with the device of the present, it will be understood by persons having skill in the art, that a single belt, attached in a manner similar to the attachment of the first belt 42, can be utilized without departing from the novel scope of the present invention. Further, other types of connections, using belts or other attachment members, and direct connections between belts, guides 10 and devices such as buckles or tether hooks (or others) can be utilized without departing from the novel scope of the present invention.

In position in a restraint system, guide 10 stretches and/or deforms in the presence of forces along the length of the belt to which it is attached, such that the forces are expended in such deformation rather than being applied to the wearer of the system.

Figure 10:
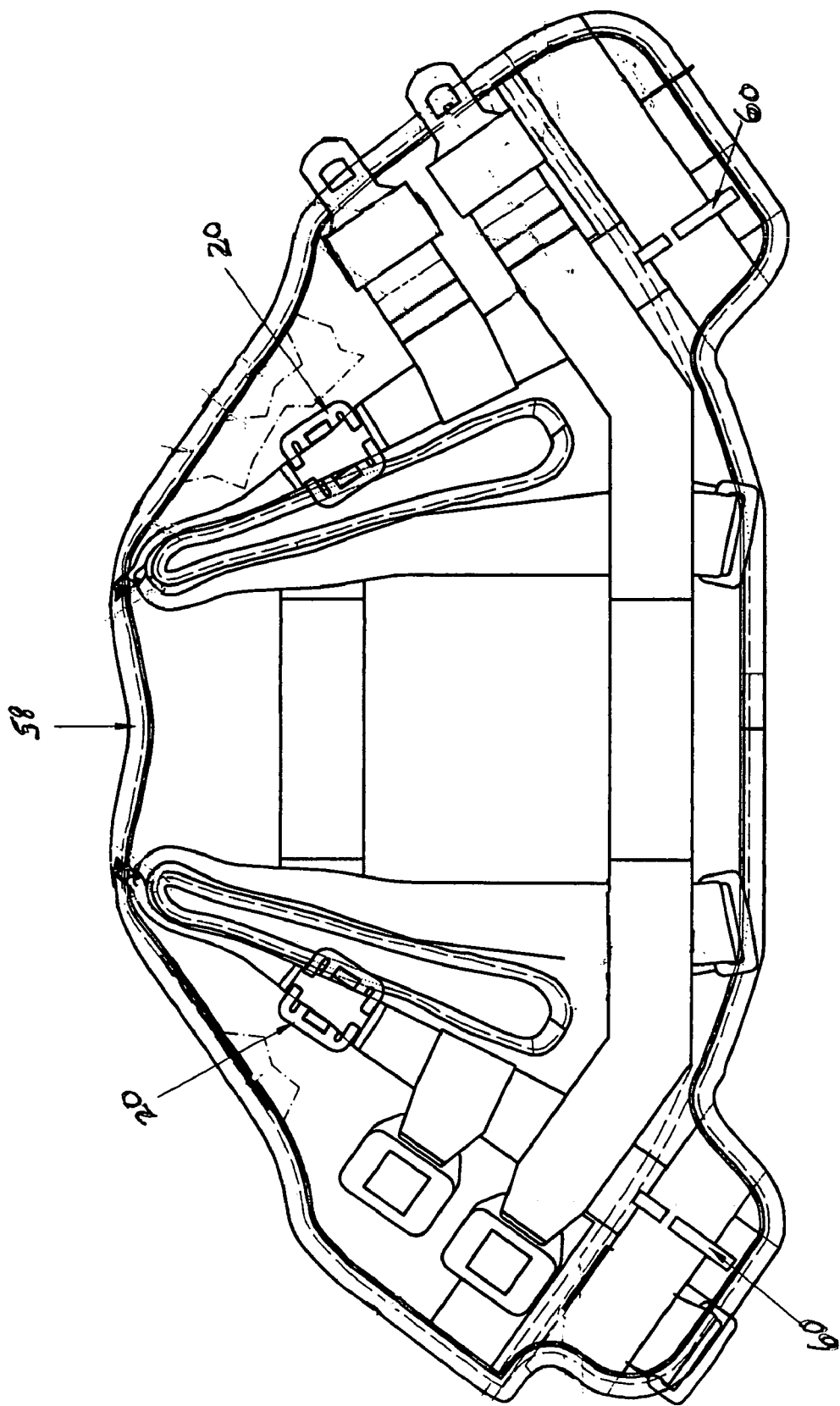
FIG. 10 is a plan view of a vest incorporating two guides of the present invention.

Referring now to FIG. 10, a supplemental restraint system vest 58, such as the ones provided in the co-pending applications incorporated into this patent by reference, above, is shown. As noted above, a guide 20 is utilized in each of the shoulder areas of the vest 58 so that the vest 58 can be worn by a passenger and attached to the automobile restraint system, via the automobile shoulder belts. In this manner small persons, including children can be appropriately restrained in the automobile without the use of a booster or child restraint seat. The use of guide 20, along with other guides 60 at the waist line of the vest 58 permit the shoulder belt and set belt to be attached to a smaller individual and ride on the appropriate skeletal and muscular positions recommended in the use of such restraints. The guides 20 literally guide the belts to the appropriate locations on the smaller persons body such that the belts emulate their positions on nominally sized persons.

Figure 11:
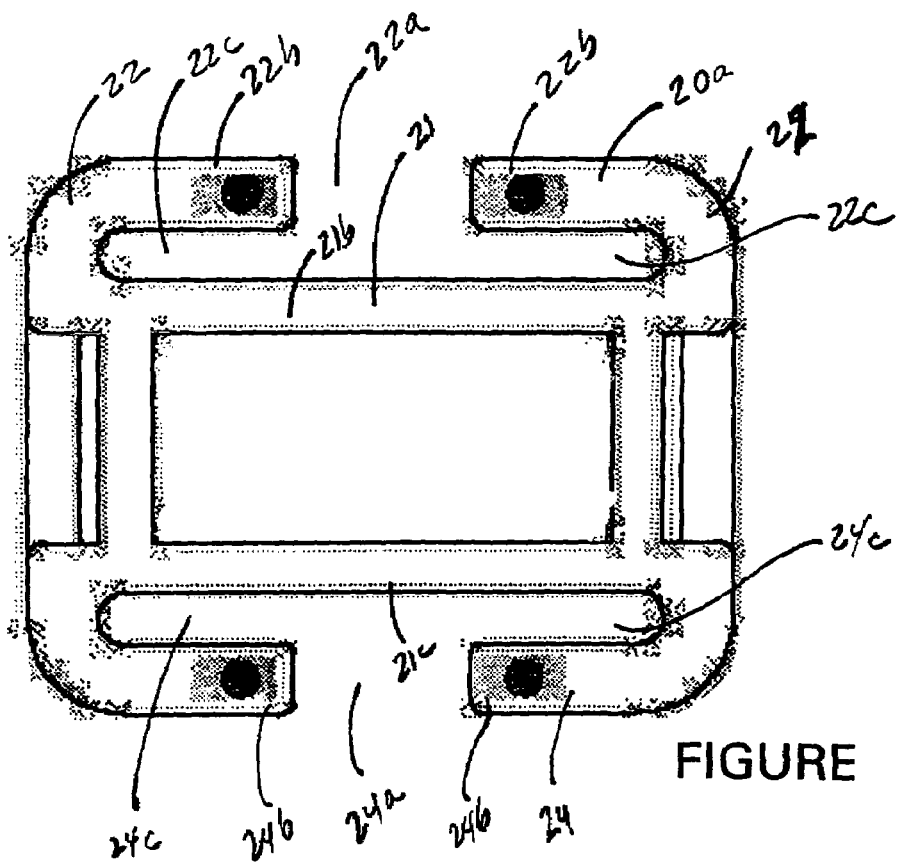
FIG. 11 is a top view of an alternative guide of the present invention.
Figure 12:
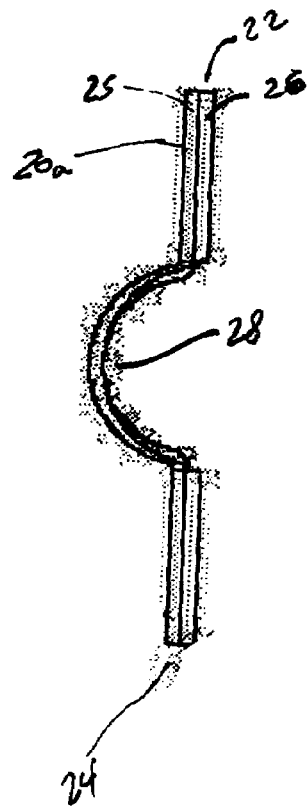
FIG. 12 is a side view of the alternative guide of FIG. 11.

Referring now to FIGS. 11 and 12, another embodiment of the second-type of guide 20a is shown. It will be seen that guide 20a is generally the same as guide 20 only missing tabs 27. It will be understood that while guide 20 offers a superior hold on a belt, it is contemplated that guide 20a can be utilized in a similar manner giving adequate protection to the user in most situations.

As shown in the figures such guides can be used, further, in another embodiment, in an automobile for an adult or other to use in association with modern seatbelts. As explained above, a deformable guide can be placed in between the webbing and one side of the seatbelt latch, such that when the seatbelt is placed under stress, by impact or other reasons, the deformable guide within the seatbelt is caused to stretch absorbing a great deal of the energy of the collision. Further, the present invention can be used in association with modern latch systems, such as those where a child restraint system is merely guided into the latches (as provided by law for every vehicle manufactured after the year 2002). In this manner, when the child restraint seat is caused to move as a result of an impact, the deformable guides absorb the energy of that movement, keeping the child restraint seat and its occupant from receiving that energy.

The guide, in a preferred embodiment, is made of multiple layers of metal and designed to receive the energy of a collision such that a guide will deform, without breaking, so as to absorb the energy of a collision. It will be understood by persons having skill in the art that various types of metals and metal alloys, as well as plastics and other materials may be used with out departing from the novel scope of the present invention.

What is claimed:

1. A supplemental restraint system for use in a vehicle the system comprising:
   at least one seat belt and one shoulder belt attached to a vehicle; and
   a vest to be worn by a person within the vehicle; and
   at least one guide for attaching the at least one seat belt and shoulder belt of the vehicle to the vest, wherein the guide is made up of two or more guide elements layered together to form the guide such that the guide elements individually and the guide deform under stress to absorb the energy of a vehicle impact.

2. The supplemental restraint system of claim 1, wherein each of the at least one shoulder belt and seat belt of the vehicle can be attached to the vest by at least one of the at least one guide.

3. The supplemental restraint system of claim 2, wherein the vest comprises three guides such that the shoulder belt of the vehicle is attached to the vest by one guide and the seat belt of the vehicle is attached to the vest by two guides.

4. The supplemental restraint system of claim 2, wherein the vest comprises four guides such that the shoulder belt of the vehicle is attached to the vest by one guide, the guide being attached to the vest at or near the shoulder, and the seat belt of the vehicle is attached to the vest by two guides, a fourth guide being attached at or near the other shoulder of the vest such that the vest can be warn for use with either the right or left shoulder belt of the vehicle.

5. The supplemental restraint system of claim 1, wherein the guide is comprised of two guide elements made of a deformable structural material.

6. The supplemental restraint system of claim 5, wherein the guide elements are composed of plastic.

7. The supplemental restraint system of claim 5, wherein the guide elements are composed of a metallic alloy.

8. The supplemental restraint system of claim 5, wherein the guide elements are composed of structural steel.

9. The supplemental restraint system of claim 5, wherein each of the guide elements is made from a different deformable structural material.

10. The supplemental restrain system of claim 1, wherein the guide is formed by layers of guide elements formed of structural materials attached together such that when the vehicle is involved in an impact, energy of the impact is absorbed by the guide and the guide elements which remain attached together to restrain the user.

11. The supplemental restraint system of claim 1, wherein the guide comprises generally a rectangular shaped member having a first end, for attachment to one of a seat belt or a shoulder belt, a second end for further attachment to the belt and intermediate said first and second ends at least one tab for holding and guiding the belt.

12. The supplemental restraint system of claim 11, wherein the guide is comprised of at least two layers, the upper layer defining the at lease one tab.

13. The supplemental restraint system of claim 1, wherein the guide is comprised of three guide elements made of a deformable structural material.

14. The supplemental restraint system of claim 1, wherein the guide is comprised of four guide elements made of a deformable structural material.

* * * * *